Dec. 20, 1966     F. C. SCHUSTER ET AL     3,292,752
INCHING CONTROL FOR LIFT TRUCKS
Filed Feb. 17, 1965
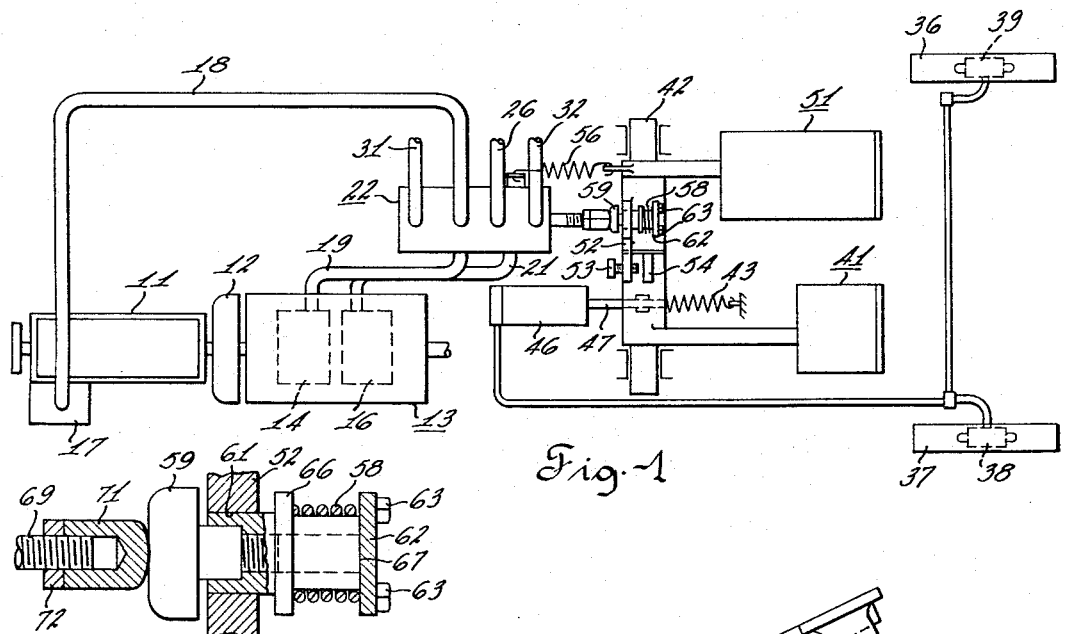
Fig. 1
Fig. 3
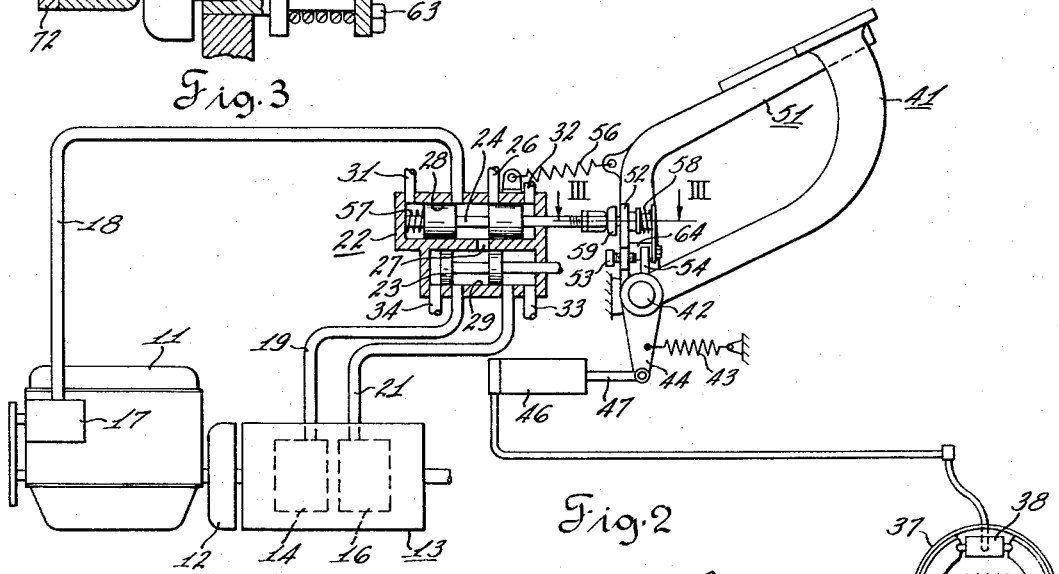
Fig. 2
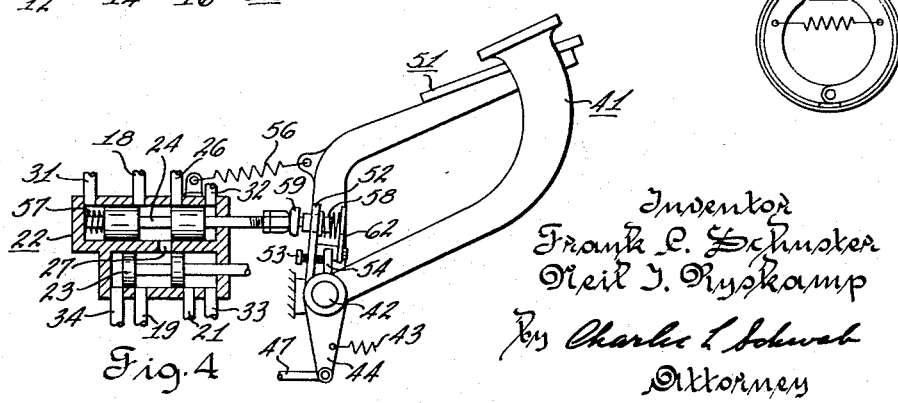
Fig. 4
Inventor
Frank C. Schuster
Neil J. Ryskamp
By Charles L. Schwab
Attorney

3,292,752
INCHING CONTROL FOR LIFT TRUCKS

Frank C. Schuster, Chicago, and Neil J. Ryskamp, Markham, Ill., assignors to Allis-Chalmers Manufacturing Company, Milwaukee, Wis.
Filed Feb. 17, 1965, Ser. No. 433,268
6 Claims. (Cl. 192—13)

This invention relates to an improved inching control for self-propelled vehicles such as lift trucks.

Heretofore inching controls for vehicles have been provided with varying degrees of success; however, some operators tend to rest their left foot on the inching pedal. The force thus applied is often sufficient to cause pedal motion and unintended slippage of the clutch. Although the operator may be trained to not rest his left foot on the inching control pedal his speed of operation and accuracy of control will be adversely affected. Also if an operator must hold his left foot suspended immediately above the inching pedal in order to achieve the quick response necessary in some inching maneuvers, the operator may become excessively fatigued.

It is an object of this invention to provide an inching control for a motor vehicle permitting the operator to rest his foot on the inching pedal without causing clutch slippage.

It is a further object of this invention to provide an inching control for a motor vehicle with a power train including a hydraulically actuated clutch which permits initial inching control pedal movement without affecting clutch engagement.

It is a further object of this invention to provide an inching control as outlined in the previous objects in which means are provided to adjust the interconnection between the inching pedal and the clutch.

It is a further object of this invention to provide an inching control which permits the operator to rest his foot on the inching pedal without declutching and which does not increase the overall effort required for declutching and braking.

These and other objects and advantages of this invention will be apparent to those familiar with the art when the following description is read in conjunction with the drawings in which:

FIG. 1 is a top view of the inching control of this invention with related components shown schematically;

FIG. 2 is a side view of the structure shown in FIG. 1;

FIG. 3 is a view taken along the line III—III in FIG. 2; and

FIG. 4 is a side view of the inching mechanism with the inching pedal slightly depressed.

Construction

The inching control illustrated in the drawings may be advantageously employed in many types of vehicles including front end loaders and lift trucks. As illustrated the vehicle includes an engine 11, which supplies power to wheels, not shown, through a torque converter 12, and power shift transmission 13. The power shift transmission has hydraulically actuated forward and reverse clutches 14, 16 which are engaged when supplied with pressure fluid by engine driven pump 17 via conduits 18, 19, 21 under the control of valve assembly 22. The valve assembly is usually mounted on the transmission housing, although not so illustrated, and includes a forward-reverse control spool 23 and a flow control element in the form of a reciprocable inching spool 24. As shown in FIG. 2, a return to reservoir port 26 is blocked by spool 24 and pressure fluid is delivered to forward clutch supply conduit 19 by way of passage 27 interconnecting spool bores 28, 29. Ports 31, 32, 33 and 34 are connected to a reservoir, not shown.

Two of the vehicle wheels are provided with brake drums 36, 37, respectively, and as shown in FIG. 2 a pair of brake shoes are operated by a wheel cylinder 38. A similar wheel cylinder 39 is provided for the braking mechanism associated with brake drum 36. A brake pedal 41 is pivotally mounted on a transverse shaft 42 and is urged toward its brake nonengaged position, in which illustrated, by a tension spring 43 interconnected between brake pedal operating arm 44 and the vehicle chassis. Depressing the brake pedal 41 moves it to a brake engaged position wherein master cylinder 46 supplies pressure fluid to the wheel brakes in response to movement of master cylinder piston 47 which is pivotally connected to the bottom end of arm 44 of brake pedal 41. The vehicle brakes may be operated by brake pedal 41 or by an inching pedal 51 with which its has a lost motion connection. The lost motion connection is formed by an upstanding lug 52 on pedal 51 carrying an adjustable abutment screw 53, and an upstanding abutment lug 54 on brake pedal 41. As shown in FIG. 1 the lug 52 extends axially of shaft 42 to place screw 53 in confronting and engageable relation to lug 54.

The inching pedal 51 is resiliently urged to its clutch engaged position, in which shown in FIGS. 1 and 2, by biasing means in the form of a tension spring 56. The spring 56 is strong enough to compress a spring 57 at one end of valve element 24 and a spring 58 loading plunger 59. The spring 58 is stronger than spring 57 and this relative strength causes the inching valve element 24 to remain in its illustrated clutch engaging position when the operator rests his foot on the inching pedal 51 causing the pedal 51 to move to the position illustrated in FIG. 4.

As illustrated, the motion transmitting means acting on inching valve spool 24 includes a wall in the form of lug 52 presenting an opening or bore 61, a motion transmitting element in the form of plunger 59 reciprocably mounted in the bore 61, the spring 58 and an abutment plate 62 secured by cap screws 63 to the lug 52 with intermediate sleeve type spacers 64. The plunger 59 includes a shoulder 66 which engages wall or lug 52, under the influence of spring 58 when the pedal 51 is pivoted through an initial movement to the position shown in FIG. 4. Thus the plunger is reciprocably mounted on the pedal 51 for movement between spaced abutments in the form of walls 52 and 62, shoulder 66 acting against wall 52 and end surface 67 acting against wall 62.

In order to allow for manufacturing tolerance and other variations, the end 69 of inching spool 24 is externally threaded as shown in FIG. 3 and an end portion in the form of a cap nut 71 is adjustably threaded thereon. A jam nut 72 locks the nut 71 is the desired position of axial adjustment.

Operation

When the inching pedal 51 is in its normal clutch engaged position, to which it is biased by spring 56 and in which shown in FIGS. 1 and 2, reservoir port 26 of valve assembly 22 is blocked and pump output conduit 18 is in fluid communication with port 27. In this condition the forward clutch 14 will be engaged if the operator has moved the valve spool 23, through linkage not shown, to the position shown in FIGS. 2 and 4. If the operator now wishes to inch forward, for instance, through a narrow passageway, he will place his left foot on the inching pedal 51 preparatory to effecting the inching or creeping movement of the vehicle. The operator may permit his left foot to rest on the pedal 51 thereby moving it to the position shown in FIG. 4 in opposition to the increasing tension force of retraction spring 56. Spring 58 actually acts to assist in this initial movement of pedal 51. When the shoulder 66 of plunger 59 abuts wall 52, spring 58 ceases to oppose the force of retraction spring 56 and the increased biasing force resisting further depression of pedal 51 will be detected by the operator. The adjusting screw 53 controlling the interconnection between the inching and braking pedal may be adjusted, as shown, so that pedal 51 picks up pedal 41 at the same time plunger 59 abuts wall 52. Further downward pivotal movement of the inching pedal 51 toward its clutch disengaged position will permit the inching valve spool 24 to move to the right, under the influence of spring 57, thereby connecting supply conduit 18 and clutch conduit 19 to reservoir conduit 26 thus effecting a reduction in clutch operating pressure and causing slippage of forward clutch 14. At the same time the clutch 14 is being slipped the brake pedal 41 will have been pivoted, in opposition to return spring 43, and the vehicle brakes at least partially applied. The degree of overlap between clutch disengagement and braking may be adjusted by screwing adjusting screw 53 in or out. The inching function can be carried out during reverse travel of the vehicle also, in which event the control valve spool would be shifted to the right to connect port 27 with reverse clutch conduit 21.

From the foregoing description it is evident that a novel improvement in inching controls has been provided. The spring loaded plunger 59 in the clutch operating valve linkage permits the operator to rest his left foot on the inching pedal, in anticipation of a need to inch the vehicle, without slipping the engaged transmission clutch. Heretofore, the weight of the operator's foot resting on the inching pedal, without conscious effort on the part of the operator to depress the pedal, frequently caused sufficient pedal movement to cause clutch slippage with consequent heat and wear. Release of the engaged clutch is prevented until a conscious effort to that end is made by the operator. By incorporating the spring loaded plunger 59 in the operating linkage for inching valve spool 24 the operating effort to effect movement of the spool 24 and application of the vehicle brakes is not increased.

The embodiments of the invention for which an exclusive property or privilege is claimed are defined as follows:

1. An inching control for a motor vehicle, comprising:
    vehicle braking means including a brake pedal movable between brake engaged and brake disengaged positions,
    means for propelling said vehicle including a power train with a hydraulically actuated clutch,
    valve means for controlling said clutch including a flow control member having clutch engaging and clutch disengaging positions,
    a clutch pedal movable between clutch engaged and clutch disengaged positions and having a lost motion connection with said brake pedal permitting independent braking with said brake pedal and combined declutching and braking with said clutch pedal,
    first biasing means resiliently urging said clutch pedal toward its clutch engaged position,
    second biasing means urging said flow control member toward its clutch disengaging position, and
    motion transmitting means between said clutch pedal and said flow control member including
        a motion transmitting element in thrust transmitting relation with said flow control member and mounted on said clutch pedal for predetermined movement relative thereto in its direction of movement, and
        spring means urging said element in relation to said clutch pedal in the direction of clutch engagement, said first biasing means being operative to overcome said second biasing means and said spring means, and said spring means being operative to overcome said second biasing means whereby the latter maintains said flow control member in its clutch engaged position during initial movement of said clutch pedal from its clutch engaged position toward its clutch disengaged position.

2. The structure set forth in claim 1 wherein said motion transmitting element is a reciprocable plunger with a shoulder and said pedal includes walls defining an opening receiving said plunger and an abutment wall engageable with said shoulder, said spring means being operative to hold said shoulder in engagement with said abutment wall when said clutch pedal is moved beyond said initial movement.

3. The structure set forth in claim 1 and further including adjusting means for changing the position of said flow control member relative to said clutch pedal.

4. The structure set forth in claim 3 wherein said adjusting means includes means for adjusting the length of said flow control member.

5. An inching control for a motor vehicle, comprising:
    vehicle braking means including a brake pedal movable between brake engaged and brake disengaged positions,
    means for propelling said vehicle including a power train with a hydraulically actuated clutch,
    valve means for controlling said clutch including a reciprocable flow control element having clutch engaging and clutch disengaging positions,
    a clutch pedal movable between clutch engaged and clutch disengaged positions and having a lost motion connection with said brake pedal permitting independent braking with said brake pedal and combined declutching and braking with said clutch pedal,
    first biasing means resiliently urging said clutch pedal toward its clutch engaged position,
    second biasing means urging said flow control element toward its clutch disengaging position, and
    motion transmitting means between said clutch pedal and said flow control element including
        a motion transmitting element in thrust transmitting relation with said flow control element and mounted on said clutch pedal for predetermined reciprocable movement relative thereto in its direction of movement, and
        spring means between said pedal and motion transmitting element urging the latter in the direction of clutch engagement, said first biasing means being operative to overcome said second biasing means and said spring means, and said spring means being operative to overcome said second biasing means whereby the latter maintains said flow control member in its clutch engaged position during initial movement of said clutch pedal from its clutch engaged position toward its clutch disengaged position.

6. The structure set forth in claim 5 wherein one of said elements is adjustable in length.

References Cited by the Examiner

UNITED STATES PATENTS 2,392,729   1/1946   Edge _____ 192—13 X
2,972,906   2/1961   Schroeder.

DAVID J. WILLIAMOWSKY, *Primary Examiner.*

B. W. WYCHE, *Assistant Examiner.*